(No Model.)

S. T. WILLIAMS.
TENSION WHEEL.

No. 339,082. Patented Mar. 30, 1886.

Witnesses:
James T. Tobin
William D. Conner

Inventor:
Samuel T. Williams
by his Attorneys
Howson and Sons

UNITED STATES PATENT OFFICE.

SAMUEL T. WILLIAMS, OF RED BANK, NEW JERSEY.

TENSION-WHEEL.

SPECIFICATION forming part of Letters Patent No. 339,082, dated March 30, 1886.

Application filed February 8, 1886. Serial No. 191,265. (No model.)

*To all whom it may concern:*

Be it known that I, SAMUEL T. WILLIAMS, a citizen of the United States, residing in Red Bank, New Jersey, have invented certain Improvements in Tension-Wheels, of which the following is a specification.

The object of my invention is to construct a simple, strong, and durable wheel, and this object I attain in the manner fully described hereinafter.

Figure 1:
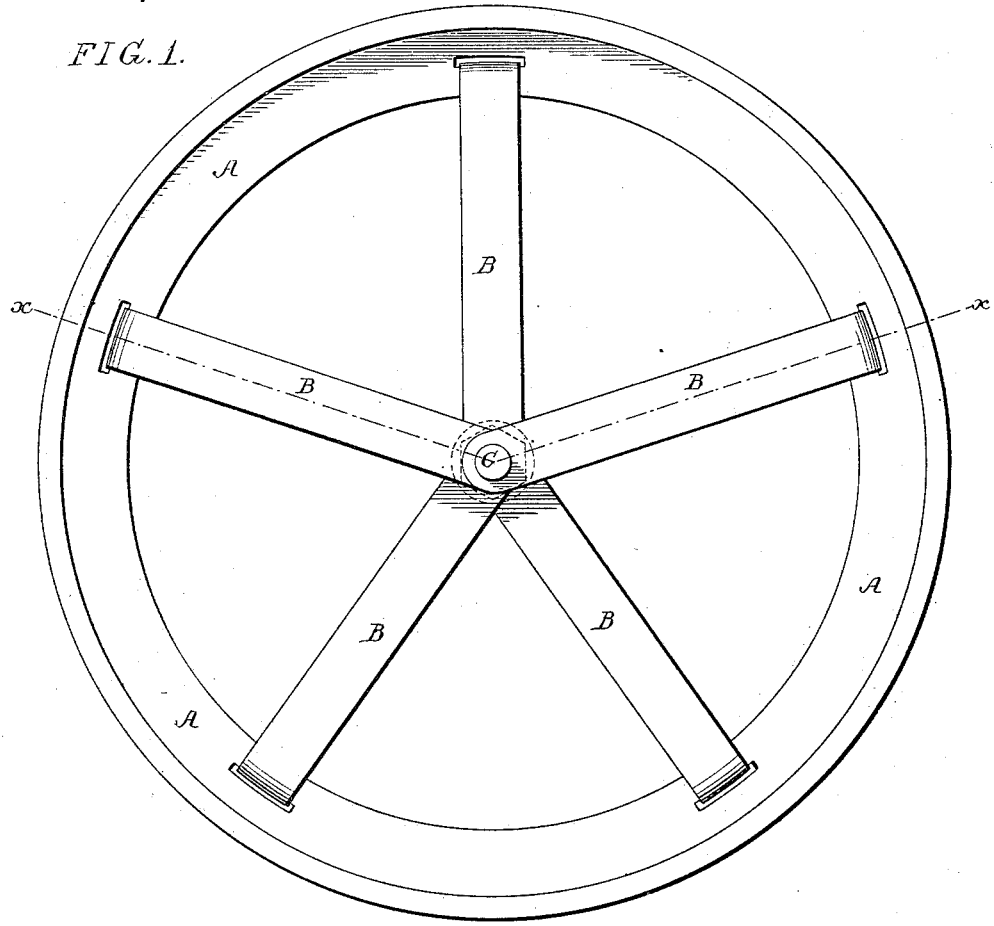
Figure 2:
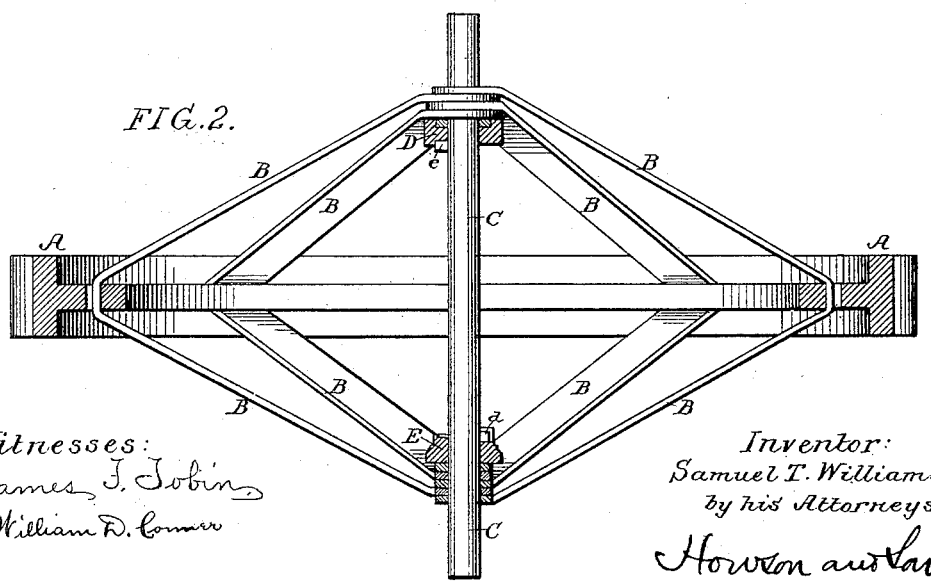

In the accompanying drawings, Figure 1 is a side view of a wheelbarrow-wheel embodying my invention, and Fig. 2 is a transverse section on the line $x\ x$, Fig. 1.

A is the rim of the wheel, which may be made of T-iron, the base forming the tire, while the flange forms the means of securing the spokes thereto by passing the said spokes through slots in the flange. These spokes B are made of flat strips of metal, and they are perforated at their opposite ends to receive or pass over the axle C, by which means the spokes are directly connected to the axle.

As shown in Fig. 2, the ends of the spokes overlap each other on the axle, and they are held in place by any suitable means.

I have shown the spokes as held at one end by a fixed nut, D, which is secured to the axle by a pin or key, $e$, on the axle, adapted to a corresponding recess in the nut. The opposite face of the nut is preferably recessed for the reception of the first spoke end, as shown in Fig. 2. The ends of the spokes on the other side of the wheel I provide with a device for increasing the tension thereof. For this purpose I may make use of the tensioning device described and claimed in the application of William Zieger, filed January 27, 1886, Serial No. 189,976. This tensioning device consists of a nut, E, having steps of varying heights interposed between the ends of the spokes, and a pin or projection, $d$, on the axle, so that by turning the nut to bring the different thicknesses of the nut to bear on the pin $d$ the tension of the spokes may be adjusted as described in the Zieger application. I do not claim or limit myself to this tensioning device, however.

The construction above described constitutes a very simple wheel, and one which may be produced very economically and without impairing its strength or durability.

The wheel shown in the drawings is intended for a wheelbarrow; but it will be understood that my improvements may be applied to other constructions of wheels—as, for instance, wheels using axle-boxes instead of axles. Wherever the term "axle" is used, therefore, in my application the term "axle-box" is applicable as an equivalent.

I claim as my invention—

1. The combination of the rim and axle of a wheel with spokes consisting of flat strips of metal having openings at their ends for the reception of the axle, substantially as set forth.

2. A wheel having a rim and axle, and spokes connected directly to the axle and provided with a tension-adjusting device, substantially as specified.

3. The combination of the rim and axle of a wheel with spokes having at their opposite ends openings fitted directly over the axle, substantially as specified.

4. A wheel having an axle and a rim, and spokes connected directly to the axle at one end to a fixed point, and having at the other end a tension device, substantially as set forth.

In testimony whereof I have signed my name to this specification in the presence of two subscribing witnesses.

SAMUEL T. WILLIAMS.

Witnesses:
WILLIAM F. DAVIS,
HARRY SMITH.